US009002595B2

(12) United States Patent
Davis et al.

(10) Patent No.: US 9,002,595 B2
(45) Date of Patent: Apr. 7, 2015

(54) TORQUE AND SPEED CONTROL IN A MACHINE WITH CONTINUOUSLY VARIABLE TRANSMISSION (71) Applicant: Caterpillar Inc., Peoria, IL (US)

(72) Inventors: Kevin Davis, Washington, IL (US); Adam Nackers, East Peoria, IL (US); Michael Barngrover, Brimfield, IL (US); Brian D. Kuras, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 226 days.

(21) Appl. No.: 13/666,527

(22) Filed: Nov. 1, 2012

(65) Prior Publication Data

US 2014/0121911 A1    May 1, 2014

(51) Int. Cl.
F16H 61/66     (2006.01)
F16H 61/472    (2010.01)
B60W 10/101    (2012.01)
B60W 10/103    (2012.01)
B60W 30/188    (2012.01)
F16H 47/04     (2006.01)

(52) U.S. Cl.
CPC ......... B60W 30/1882 (2013.01); B60W 10/103 (2013.01); B60W 2710/1038 (2013.01); B60W 2710/105 (2013.01); B60Y 2200/411 (2013.01); F16H 47/04 (2013.01)

(58) Field of Classification Search
None
See application file for complete search history.

(56) References Cited

U.S. PATENT DOCUMENTS

| 4,056,176 | A |   | 11/1977 | Förster et al. |
| 4,458,560 | A |   | 7/1984  | Frank et al. |
| 5,154,267 | A |   | 10/1992 | Watts |
| 5,389,051 | A |   | 2/1995  | Hirate et al. |
| 5,526,261 | A |   | 6/1996  | Kallis et al. |
| 5,846,155 | A | * | 12/1998 | Taniguchi et al. ............... 477/2 |
| 6,217,477 | B1 |  | 4/2001  | Nobumoto et al. |
| 6,223,118 | B1 | *| 4/2001  | Kobayashi et al. ............ 701/96 |
| 6,223,592 | B1 |  | 5/2001  | Genise |
| 6,240,356 | B1 |  | 5/2001  | Lapke |
| 6,260,440 | B1 | *| 7/2001  | Cronin et al. ............... 74/733.1 |
| 6,347,680 | B1 |  | 2/2002  | Mianzo et al. |
| 6,385,970 | B1 |  | 5/2002  | Kuras et al. |
| 6,388,407 | B1 |  | 5/2002  | Eguchi |

(Continued)

FOREIGN PATENT DOCUMENTS

EP    1640640 A1    3/2006
EP    2474457       7/2012

(Continued)

Primary Examiner — Fadey Jabr
Assistant Examiner — Kevin P Mahne
(74) Attorney, Agent, or Firm — Leydig, Voit & Mayer, Ltd.

(57) ABSTRACT

A method regulates the torque output and/or speed output of a continuously variable transmission (CVT) in a manner that may simulate a clutch. The CVT may be incorporated in a machine and maybe operatively coupled to a power source and to a propulsion device. The method utilizes an unaltered torque-to-speed curve that relates the torque output to the speed output of the CVT. The method may receive an operator input signal indicating a desire to change operation of the machine. The torque-to-speed curve may be shifted in response to the operator input signal to limit the torque output available. In an aspect, an under-run curve may be applied to the torque-to-speed curve, the under-run curve corresponding to a target speed. The operator input signal may also shift the under-run curve to reduce the target speed.

20 Claims, 8 Drawing Sheets (56) References Cited

U.S. PATENT DOCUMENTS

| | | |
|---|---|---|
| 6,389,347 B1 | 5/2002 | Nozaki |
| 6,474,186 B1 | 11/2002 | Vollmar |
| 6,817,338 B2 | 11/2004 | Janic et al. |
| 7,192,374 B2 | 3/2007 | Kuras et al. |
| 7,296,496 B2 | 11/2007 | Shah |
| 7,400,964 B2 | 7/2008 | Shiiba et al. |
| 7,401,542 B2 | 7/2008 | Stephens et al. |
| 7,641,588 B2 | 1/2010 | Thomson et al. |
| 7,669,580 B2 | 3/2010 | Silbernagel et al. |
| 7,762,923 B2 | 7/2010 | Schuh et al. |
| 7,848,858 B2 * | 12/2010 | Tabata et al. .................... 701/22 |
| 7,894,968 B2 | 2/2011 | Stroh et al. |
| 7,972,240 B2 | 7/2011 | Janasek |
| 8,070,651 B2 | 12/2011 | Eastman et al. |
| 8,216,109 B2 | 7/2012 | Dahl et al. |
| 8,438,846 B2 * | 5/2013 | Ohtsukasa ..................... 60/431 |
| 8,733,489 B2 * | 5/2014 | Heine et al. ................... 180/170 |
| 2002/0115529 A1 * | 8/2002 | Narita et al. .................... 477/40 |
| 2002/0128115 A1 * | 9/2002 | Narita et al. .................... 477/37 |
| 2004/0098988 A1 * | 5/2004 | Goi .................................. 60/772 |
| 2005/0279546 A1 * | 12/2005 | Tabata et al. ................. 180/65.2 |
| 2008/0103019 A1 * | 5/2008 | Cronin et al. .................... 477/46 |
| 2008/0172162 A1 * | 7/2008 | Wegeng et al. ................. 701/70 |
| 2008/0269011 A1 * | 10/2008 | Sopko et al. ..................... 477/34 |
| 2009/0082945 A1 * | 3/2009 | Kuras et al. ................... 701/105 |
| 2009/0088936 A1 | 4/2009 | Hubbard et al. |
| 2009/0112391 A1 * | 4/2009 | Uematsu ......................... 701/29 |
| 2009/0112424 A1 | 4/2009 | Dahl et al. |
| 2009/0143192 A1 * | 6/2009 | Fuchs et al. ..................... 477/43 |
| 2009/0143948 A1 * | 6/2009 | Dahl et al. ...................... 701/56 |
| 2009/0288893 A1 * | 11/2009 | Wyall et al. ................. 180/65.22 |
| 2010/0114440 A1 * | 5/2010 | Lin et al. ......................... 701/50 |
| 2010/0137102 A1 | 6/2010 | Sopko, Jr. et al. |
| 2011/0088961 A1 | 4/2011 | Case et al. |
| 2011/0238272 A1 * | 9/2011 | Kato ............................... 701/55 |
| 2011/0301793 A1 | 12/2011 | Hsieh et al. |
| 2012/0083976 A1 | 4/2012 | Fleming et al. |
| 2012/0136548 A1 | 5/2012 | Hoff |
| 2012/0158264 A1 * | 6/2012 | Kuras et al. ..................... 701/67 |
| 2012/0293316 A1 * | 11/2012 | Johnson et al. ............... 340/438 |
| 2013/0053215 A1 * | 2/2013 | Hou ................................. 477/37 |
| 2013/0253783 A1 * | 9/2013 | Gratton et al. .................. 701/51 |
| 2013/0332035 A1 * | 12/2013 | Shioiri et al. ................... 701/50 |
| 2014/0005866 A1 * | 1/2014 | Kuang et al. .................... 701/22 |

FOREIGN PATENT DOCUMENTS

| | | |
|---|---|---|
| JP | 01-244930 A | 9/1989 |
| JP | 11342769 | 12/1999 |
| JP | 2010-078089 A | 4/2010 |

* cited by examiner

TORQUE AND SPEED CONTROL IN A MACHINE WITH CONTINUOUSLY VARIABLE TRANSMISSION

TECHNICAL FIELD

The present disclosure relates generally to a machine equipped with a continuously variable transmission (CVT) and, more particularly, to controlling the power output of the CVT.

BACKGROUND

Many machines use transmissions to couple the output of a prime mover or power source, for example, an internal combustion engine, to a driven element or device such as wheels or a work implement. Traditional transmissions typically included one or more fixed, selectably engageable gear ratios that could increase or decrease the speed of the prime mover and, usually in an inverse relationship, the torque that is output to the driven element. To assist in the controlled transfer of rotary power output from the prime mover and, in some instances, to facilitate the selective engagement and disengagement of the gear ratios, the transmission may be coupled to a clutch. Typically, clutches interconnect a driving member, such as a drive shaft, and a driven member, such as a line shaft, that may be engaged and disengaged to couple and de-couple the power source and transmission. Some clutches are also capable of slipping, where the driving member and driven member are engaged, but spinning at different relative speeds. The degree of slipping may be adjustably controlled so that speed and/or torque transferred across the clutch may be selectively varied. A clutch may therefore function as a type of speed control inducing a temporary speed and/or torque decrease without having to shift gears.

Recently, some manufacturers have equipped machines with continuously variable transmissions (CVTs) instead of the conventional, gear-based transmissions. A CVT provides an infinite or continuous range of torque-to-speed output ratios with respect to any given input from the prime mover. In other words, the output of the CVT can be increased or decreased across a continuous range in almost infinitesimally small increments. In some embodiments, to improve operator recognition and familiarity, the CVT may be regulated according to a virtual gear methodology that simulates a plurality of virtual gear ratios resembling the actual gear ratios in conventional transmissions. Additionally, by selectively varying the input and output ratios, a CVT may provide some of the functionality of a clutch.

In some instances, a CVT and a clutch may be used together to combine their functionalities. For example, U.S. Pat. No. 7,972,240 ("the '240 patent") describes an arrangement that includes a CVT operatively coupled with a clutch. A feature of this arrangement is that the CVT and the clutch may be regulated in an interrelated manner to limit the torque and/or speed output transferred to the driven elements. The '240 patent further describes that regulating the two devices in an interrelated manner may avoid power losses or inefficiencies that may occur in arrangements that include only CVT to transfer power output. The present disclosure is directed to similar considerations of clutch and CVT functionality.

SUMMARY

In an aspect, the disclosure describes a method of controlling speed in a machine having a continuously variable transmission (CVT) operatively coupled to a power source. The method regulates the output of the CVT in accordance with a torque-to-speed curve that may relate, in a generally inverse manner, the CVT output torque and the CVT output speed. The torque-to-speed curve may function to limit the CVT output torque. An operator input signal indicating a desired change in the machine operation is received and converted to a first scaling factor. As a result, the torque-to-speed curve is shifted to further reduce the CVT output torque available.

In another aspect, the disclosure describes a machine having a continuously variable transmission (CVT) operatively coupled to a power source. The CVT is capable of producing a CVT output torque and a CVT output speed. The machine includes a first operator input device for producing an operator input signal to change operation of the machine. The machine also includes a controller communicating with the first operator input device. The controller further controls the output of the CVT in accordance with a control map. The control map has a torque-to-speed curve relating the CVT output torque to the CVT output speed and an under-run curve corresponding to a target speed. The controller may simultaneously adjust the torque-to-speed curve and the under-run curve upon receipt of the operator input signal.

In yet another aspect, the disclosure describes a method of regulating output of a continuously variable transmission (CVT) including a CVT output torque and a CVT output speed. A first operator input signal is received indicating a target speed. If the CVT output speed is a predetermined quantity less than the target speed, the method determines the CVT output torque in accordance with a torque-to-speed curve. If the CVT output speed is within the predetermined quantity of target speed, the method determines the CVT output torque in accordance with an under-run curve. A second operator input may be received to adjust operation of the CVT. The method adjusts the torque-to-speed curve and the under-run curve upon receiving the second operator input signal to reduce the CVT output torque available and the target speed.

DETAILED DESCRIPTION

This disclosure relates to a machine equipped with a continuously variable transmission (CVT) to operatively couple and transfer mechanical power from a prime mover power source to a driven element. CVTs may sometimes be referred to as infinitely variable transmissions (IVTs), however, the disclosure relates to both transmissions and any similar type of transmission regardless of nomenclature. Now referring to FIG. 1, wherein like reference numbers refer to like elements, there is illustrated an embodiment of a machine 100 and, in particular, a motor grader designed in accordance with the present disclosure. However, the present disclosure is applicable to other types of machines and applications in addition to motor graders. As used herein, the term "machine" may refer to any type machine that performs some operation associated with an industry such as mining, construction, farming, transportation, or any other industry known in the art. For example, the machine may be an earth-moving machine, such as a wheel loader, excavator, dump truck, backhoe, excavator, material handler or the machine may be another type of working machine such as a compactors, pavers, etc. Moreover, an implement may be connected to the machine. Such implements can be utilized for a variety of tasks, including, for example, loading, compacting, lifting, brushing, and include, for example, buckets, compactors, fork lifting devices, brushes, grapples, cutters, shears, blades, breakers/hammers, augers, and others. Additionally, the machine can be used in the transportation field such as on-highway trucks, cargo vans, or the like.

Figure 1:
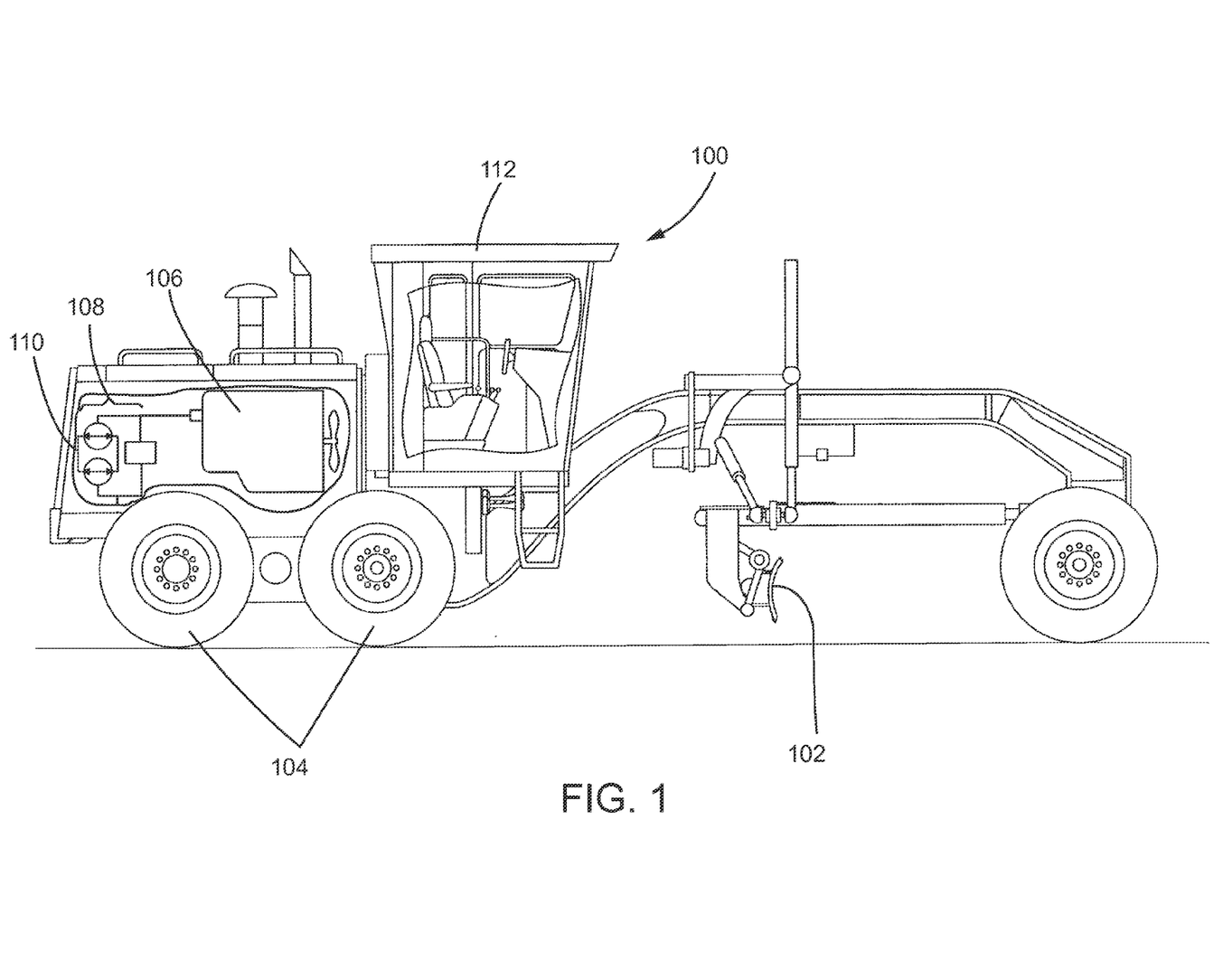
FIG. 1 is a diagrammatical, side elevational view of a mobile machine having a prime mover power source coupled to a driven element through an intermediate CVT.

The illustrated machine 100 may be capable of alternating between high-speed, over-the-road travel and heavy, load-engaging operation. For example, the machine 100 can include a ground-engaging implement such as a blade 102 that may be power adjusted for flattening or smoothing a worksite surface. The machine 100 is suspended on ground engaging propulsion devices 104 such as wheels that may be disposed toward the front and the rear of the machine. In other machine embodiments, alternative propulsion devices 104 may include continuous tracks, belts, propellers, etc. To propel and direct the machine with respect to the ground, at least one set of the propulsion device may be power-driven to rotate and/or another set may be steerable by an operator onboard, remotely, or by another control scheme.

Power for driving the propulsion devices and/or the attached implement can be provided by a power source 106, sometimes referred to as a prime mover, that is disposed on the machine. A suitable example of a power source 106 is an internal combustion engine, such as a compression ignition diesel engine, that burns a hydrocarbon-based fuel or another combustible fuel source to convert the potential or chemical energy therein to mechanical power that may be utilized for other work. Other suitable types of power sources 106 can include spark-ignition gasoline engines, turbines, hybrid engines, solar powered engines, and the like. To transfer the mechanical power produced by the power source 106 to the propulsion devices 104, the machine 100 can include a powertrain 108 operatively coupling the power source and the propulsion devices. To adjust the speed and/or torque output of the power source, a CVT 110 may be disposed intermediately in the powertrain 108. The powertrain 108 may also include various shafts, clutches, differentials, and other devices to transmit power and to assist in operation of the machine. Additionally, one or more power takeoffs (PTOs) may engage directly or indirectly with the powertrain 108 to redirect or retransmit a portion of the power to an auxiliary device such as the power-actuated blade 102.

Figure 2:
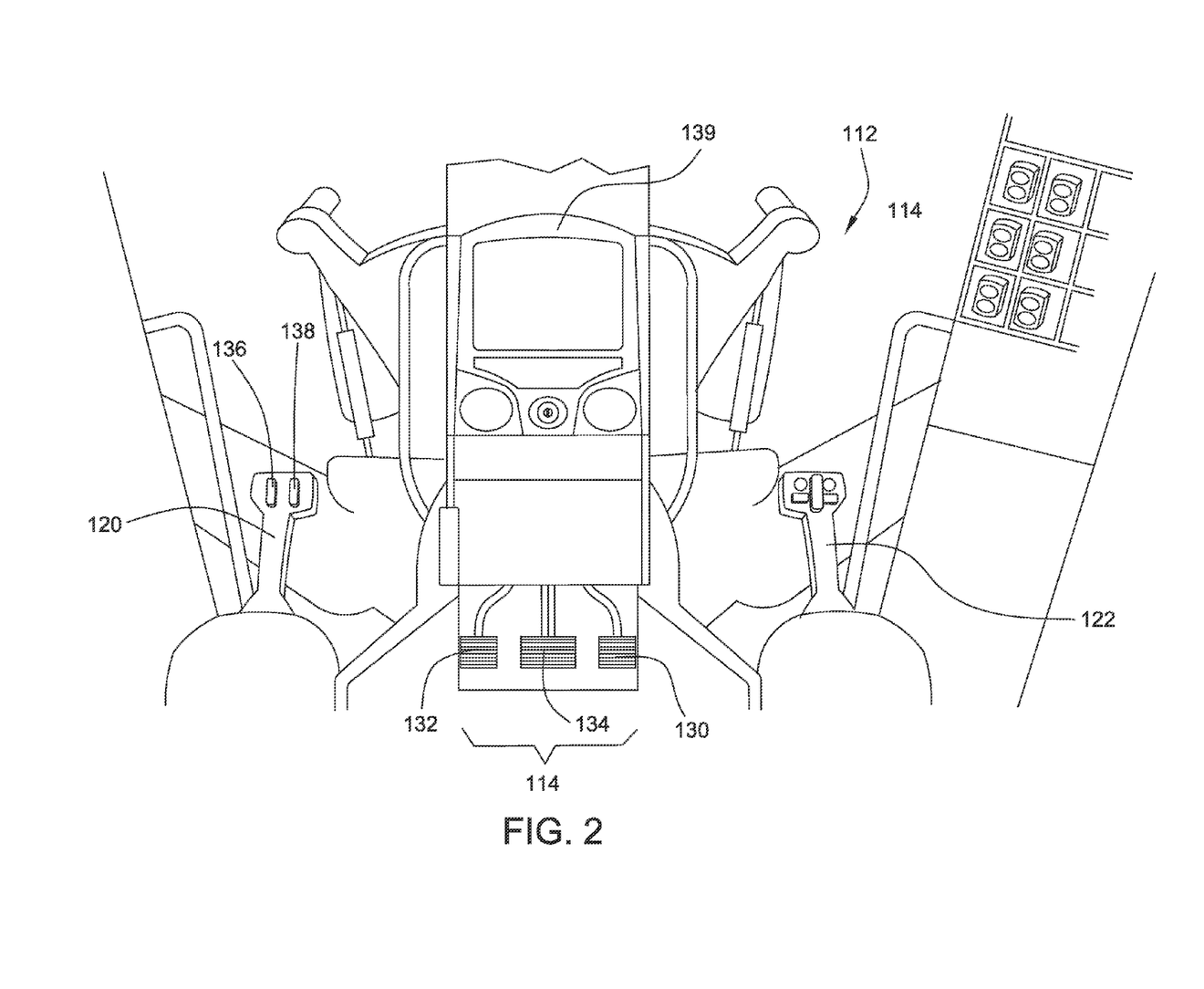
FIG. 2 is a fragmentary perspective view taken from an operator's chair in an operator station for the machine including various accessible, operator-actuated controls and inputs for operating the machine.

To direct operation of the machine 100, an operator station 112 configured to accommodate an operator may be disposed on the machine or remotely in a location that allows visual command over the operating environment. Referring to FIG. 2, various controls and/or inputs 114 with which the operator may interact to maneuver and operate the machine 100 may be accessible inside the operator station 112. The controls and/or inputs illustrated in FIG. 2 are provide by way of example only and may include different arrangements in different embodiments. For example, to steer or control the direction of the machine, a first control column or joystick 120 and a second joystick 122 may be disposed to either side of the operator station 112. The operator may grasp and manipulate the joysticks 120, 122 to adjust operation of the machine or it implements. For example, the first joystick 120 may control steering and the second joystick 122 may control an implement. In other embodiments, a steering wheel or other suitable type of control may be included.

In the illustrated embodiment, the controls may include one or more articulating pedals located toward the floor that an operator may modulate by depressing or releasing with his feet. An operator may depress or release a pedal through a range of displacement to bring about an expected response from the machine. For example, to control or adjust the speed or propulsion of the machine, the pedals may include a first pedal 130 oriented toward the right of the operator station 112 that may function as a throttle pedal. By modulating the first pedal 130, the operator may indicate a desire to accelerate or decelerate the machine so as to increase or decrease the speed or velocity of the machine. The operator may also indicate a desire to maintain a consistent speed or power output of the machine by holding the pedal at a fixed modulation with respect to a ground. The second pedal 132 may function to engage and/or simulate a clutch. As described below, the operator may modulate the second pedal 132 to direct engagement or disengagement of the CVT from the rest of the powertrain. Further, by modulating the second pedal through intermediate degrees between fully depressed and fully released, the operator may direct and regulate "slippage" affecting the transmission rate of power so that only a portion of the total rotary power is transmitted through the powertrain. The center-oriented third pedal 134 may actuate a brake to decrease speed and/or stop the machine. In other embodiments, controls or inputs other than a pedal, such as levers or the like, may be used to adjust the speed of the machine and may be considered speed control throttles.

The operator station may also include inputs, controls and indicators regarding the operation of the CVT that may be disposed in the powertrain to transmit power between the power source and the propulsion devices. For example, to change the direction of the machine, a forward-neutral-reverse (F-N-R) selector 136 in the form of a toggle or switch may be disposed in an appropriate accessible location, such as on the first joystick 120. Toggling of the F-N-R selector 136 may change the engagement or operation of the CVT to so that the rotary output propels the machine in the forward or reverse direction, or may it disengage the CVT so that the machine is stayed in a neutral state. If the CVT is configured for a virtual gear methodology simulating a plurality of virtual gears, the operator station 112 may include a virtual gear shifter 138 in the form of a roller or slide switch. Toggling or shifting the virtual gear shifter 138 may cause or simulate shifting between adjacent virtual gear ratios. Various other types of switches, knobs buttons, dials, levers or the like may be included. Other control functionalities may include, for example, throttle locks, ignition, work implement controls, and the like. In other embodiments, the controls and operator station may be located remotely from the machine.

To visually interact with the operator, a visual display 139 including a screen or monitor may be provided in the operator station 112. The visual display 139 may display, for example, information regarding operating parameters, performance characteristics, conditions, and variables regarding various aspects of the machine's operation. Common display information may include speed, direction, power source revolutions-per-minute (RPM), engine load, fuel level, and the like. The visual display 139 may be any suitable type of display including a liquid crystal display (LCD), a cathode ray tube (CRT), a plasma display or the like. Additionally, the visual display 139 may be configured to receive input from the operator through touch-screen technology, soft buttons and so forth.

Figure 3:
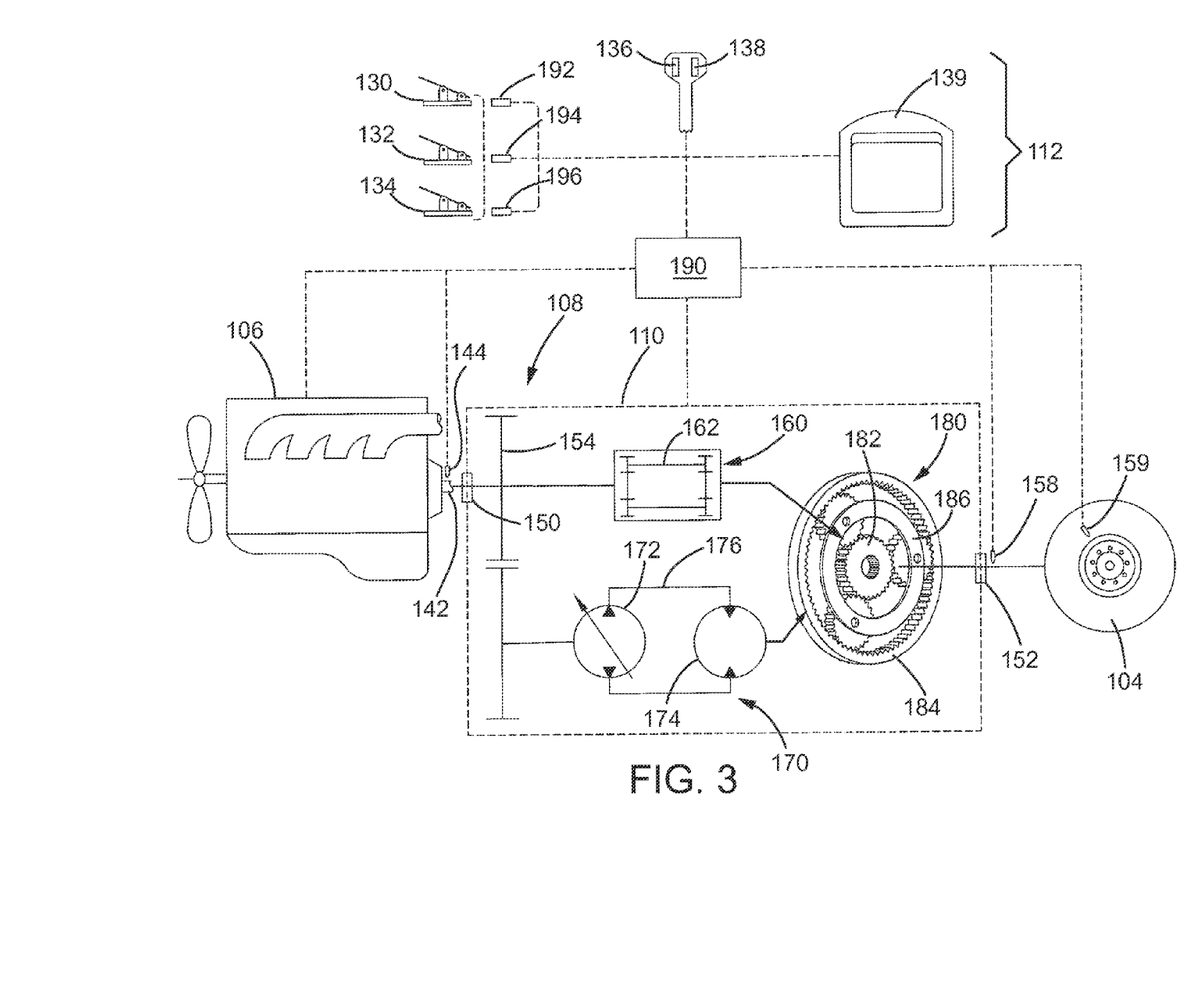
FIG. 3 is a schematic illustration of a powertrain of the machine including an embodiment of a CVT and a controller adapted to operate the CVT using a plurality of virtual gear ratios.

Referring to FIG. 3, an embodiment of the powertrain 108 for transferring mechanical power through the machine is illustrated in more detail. The prime mover power source 106, for example, a diesel-burning internal combustion engine 140, produces rotational power that may rotate a power source output 142, such as a drive shaft, extending from the power source. The power produced by the engine 140 may be quantifiable as speed and/or torque delivered through the power source output 142. To measure the speed and/or torque, a power source sensor 144 of any appropriate design. For example, the power source sensor 144 may be associated with the power source output 142. The power source sensor 144 may be a magnetic pickup type sensor that may sense a rotating magnetic field associated with a rotating component of the power source output 142, such as a flywheel or drive shaft. By way of further example, in other embodiments the power source sensor 144 may be an optical pickup sensor that optically reads a visual indication on the rotating component. The possible speed and torque outputs may in part be a function of the engine design including dimensional parameters, displacement, etc. The speed and, in a somewhat related manner, the torque produced may be selectively varied to an extent by adjusting the operating parameters and inputs to the engine 140. The engine 140 may be operatively associated with other features, such as an intake system, an exhaust system, cooling systems and the like.

To adjust the speed and/or torque to a greater degree, for example, by increasing speed and inversely affecting torque, the rotational output of the power source 106 may be directed to the CVT 110 disposed down line of and operatively coupled to the power source output 142. As stated above, the CVT 110 may provide a continuous or infinite number of available torque-to-speed ratios for varying the output from the power source 106. In other words, the CVT 110, which is represented as a dashed-line box, can receive the rotational output though a CVT input member 150 associated with the power source output 142, and modify it in a controlled manner by changing the torque-to-speed ratio across a continuous range or spectrum before transmitting it through a CVT output member 152. To vary the torque-to-speed ratio, one or more operational characteristics of the CVT may be responsively controlled.

In the illustrated embodiment, the CVT 110 may be a split-path, hydromechanical CVT in which the rotational input from the CVT input member 150 is proportionally split into two parallel paths before being recombined at the CVT output member 152. The paths may include a mechanical power-transfer path 160 and a hydrostatic power-transfer path 170 disposed inside the CVT 110. To physically split the rotational input, a path splitter 154 coupled to a shaft of the CVT input member 150 may include a series of parallel, intermeshing gears that may duplicate and offset the rotational axis of the rotary input to align with either or both of the mechanical power-transfer path 160 and the hydrostatic power-transfer path 170.

The mechanical power-transfer path 160 may transfer the rotational power input from the CVT input member 150 to the CVT output member 152 by mechanical, dynamic techniques. For example, the mechanical power-transfer path 160 may embody a multispeed, bidirectional, mechanical transmission with various forward gears, reverse gears and/or clutches. The gears and/or clutches may be arranged in an adjustable and selectively engageable gear train 162 so that predetermined gear combinations may be engaged to produce a discrete output gear ratio. In this manner, the mechanical power-transfer path may function similarly to the traditional gear-based transmissions.

The hydrostatic power-transfer path 170 may transfer the rotational power output from the CVT input member 150 to the CVT output member 152 using fluid mechanics and hydraulics concepts. For example, the hydrostatic power-transfer path 170 may include a hydraulic pump 172 and a hydraulic motor 174 interconnected by a fluid transfer line 176 such as a flexible hydraulic hose that may channel hydraulic fluid. The hydraulic pump 172, which may be a variable displacement pump, swash plate, or the like, may be operatively coupled to the CVT input member 150 and can convert the rotary power input to hydraulic pressure by pressurizing the hydraulic fluid in the fluid transfer line 176. The fluid transfer line directs the pressurized hydraulic fluid to the hydraulic motor 174 to rotate an associated impeller or the like and reconvert the hydraulic pressure to a rotational output. A "gear ratio" or "effective gear ratio" of the hydrostatic power-transfer path 170 may be altered by, for example, varying the displacement of the hydraulic pump 172 or changing the resistance of the fluid transfer line 176. Hydraulic displacement and/or resistance may be varied continuously within the operational limits of the CVT to provide an infinite number of effective gear ratios.

The outputs of the mechanical power-transfer path 160 and a hydrostatic power-transfer path 170 may be recombined using one or more gear assemblies operating in conjunction with the CVT output member 152. For example, the gear assemblies may include a planetary gear 180 including an inner sun gear 182, an outer ring gear 184, and an intermediary carrier 186 operatively engaged with each other. As will be appreciated by those of skill in the art, the interrelationship and the relative rotation of the various gears in a planetary gear can be adjusted to produce a variety of different outputs including reversible outputs. For example, the speed at which ring gear 184 rotates relative to a ground, and the speed at which carrier 186 rotates relative to ring gear 184, may determine a rotational speed of sun gear 182. Accordingly, any combined gear ratio may be achieved by varying the discrete gear ratio of the mechanical power-transfer path 160, the variable gear ratio of the hydrostatic power-transfer path 170, and recombining them at different selected relations in the planetary gear 180, thus changing the output torque and speed characteristics of the CVT 110.

In other embodiments, the CVT can be a purely mechanical CVT using a series of selectable, interrelated gear trains such as the gear train 162 in FIG. 3. The purely mechanical CVT may also be realized as a variable diameter friction pulley system including two or more, parallel, inverted cone-like pulleys interconnected by a belt. An actuator may axially displace the belt with respect to the parallel pulleys to align at different diameters thereby producing variable torque and speed outputs. In other embodiments, the CVT may be a purely hydrostatic CVT similar to the hydrostatic power-transfer path 170 in FIG. 3. Furthermore, the CVT may be an electrical-magnetic CVT including a generator-motor combination. The rotational input may drive the generator to produce electricity that drives the motor to reproduce the rotational output. To continuously vary the torque-to-speed ratio, the electrical resistance between the generator and motor may be adjusted in increasingly small increments. In other embodiments, any other suitable type of CVT may be used.

To selectively couple and de-couple the CVT 110 to/from the rest of the powertrain 108, the CVT input member 150 and/or the CVT output member 152 may be clutches. As described above, clutches may include two or more selectively engageable components that, when engaged, may transmit rotational power or force. However, when disengaged, the clutch is no longer able to transfer or transmit power. If both the CVT input member 150 and CVT output member 152 are disengaged clutches, then the CVT 110 may be effectively isolated from the rest of the powertrain 108. Moreover, if the CVT output member 152 is a disengaged clutch, transfer of rotary power to the propulsion device 104 is prevented even if the CVT 110 is operating under input from the power source 106. In this embodiment, any suitable type of clutch may be used including mechanical friction clutches, fluid clutches, electrical or electronic clutches and the like.

To measure the rotational output of the CVT 110, a CVT sensor 158, such as a magnet pickup sensor or an optical sensor, may be associated with the CVT output member 152 to sense the rotational speed produced. In another embodiment, the torque output of the CVT 110 may be determined by a sensor disposed in the fluid transfer line 176 that measures hydraulic pressure therein. The torque transfer through the CVT may then be estimated from the measured hydraulic pressure and any possible transmission losses or inefficiencies may be accounted for. The powertrain 108 may terminate at a propulsion device 104, such as a rotatable wheel that engages the ground and propels the machine. Various axles, differentials and the like may facilitate the engagement of the powertrain 108 to the wheel. In the embodiment of FIG. 3, a machine speed sensor 159, such as a magnetic pickup or optical sensor, may be associated with the propulsion device. Machine speed, i.e., distance traveled per time, may be calculated by multiplying the revolutions per second of the wheel by the circumference of the wheel. In general, the machine speed should generally directly correspond to the output speed of the CVT. In other words, controlling the output of the CVT determines the machine speed. However, in some cases, the propulsion devices may be slipping, spinning out or hydroplaning with respect to the ground, in which case the measured machine speed may not equal the CVT output speed. In some embodiments, the machine speed sensor 159 or another sensor may be configured to determine if the propulsion devices are not engaging the ground appropriately.

To coordinate and control the various components in the powertrain 108 including the CVT 110, the machine may include an electronic or computerized control unit, module or controller 190. The controller 190 may be adapted to monitor various operating parameters and to responsively regulate various variables and functions affecting the powertrain. The controller 190 may include a microprocessor, an application specific integrated circuit (ASIC), or other appropriate circuitry and may have memory or other data storage capabilities. The controller may include functions, steps, routines, control maps, data tables, charts and the like saved in and executable from read-only memory or another electronically accessible storage medium to control the engine system. Storage or computer readable mediums may take the form of any media that provides instructions to the controller for execution. The mediums may take the form of non-volatile media, volatile media, and transmission media. Non-volatile media includes, for example, optical or magnetic disks. Volatile media includes dynamic memory. Transmission media includes, for example, coaxial cables, copper wire and fiber optics, and can also take the form of acoustic or light waves, such as those generated during radio-wave and infra-red data communications. Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer or processor can read. Although in FIG. 3, the controller 190 is illustrated as a single, discrete unit, in other embodiments, the controller and its functions may be distributed among a plurality of distinct and separate components. To receive operating parameters and send control commands or instructions, the controller may be operatively associated with and may communicate with various sensors and controls in the operator station 112 and the powertrain 108. Communication between the controller and the sensors may be established by sending and receiving digital or analog signals across electronic communication lines or communication busses. The various communication and command channels are indicated in dashed lines for illustration purposes.

For example, to register a desired increase or decrease in the speed or power output of the machine with respect to the ground, the controller 190 may communicate with a first pedal sensor 192 associated with and registering articulation of the first pedal 130 intended as a throttle register. The first pedal sensor 192 may generate an operator input signal upon modulation of the first pedal and communicate that operator input signal to the controller 190 that may accordingly adjust operation of one or more components in the powertrain 108 to increase or decrease machine speed and/or output. The controller 190 may also communicate with a second pedal sensor 194 associated with the second pedal 132 that may function as a clutch and with a third pedal sensor 196 associated with the third pedal 134 that may function as a brake. The controller 190 may also communicate with the F-N-R selector 136 to register an input commanding a change in travel direction and may communicate with the virtual gear shifter 138 to register an input commanding a shift of the virtual gears. The controller 190 may also be in communication with the visual display 139 and may send and receive information with the display.

To further assist operation, the controller may also communicate with other sensors or monitors disposed about the machine. For example, the controller may communicate with the power source sensor 144 so that the controller may determine the speed or output characteristics of the power source output 142. The controller 190 may also communicate with the CVT sensor 158 to monitor the output of the CVT 110, such as the CVT output speed and/or CVT output torque. In those embodiments in which the CVT output member 152 is a clutch, the CVT sensor 158 may also measure the transmission rate or effectiveness of the output from the CVT 110 to the propulsion device 104. To determine the machine speed, the controller 190 may communicate directly with the machine speed sensor 159 associated with the propulsion devices 104. The foregoing description is exemplary, and the controller may communicate with other sensors measuring other aspects of the operation of the machine.

Figure 4:
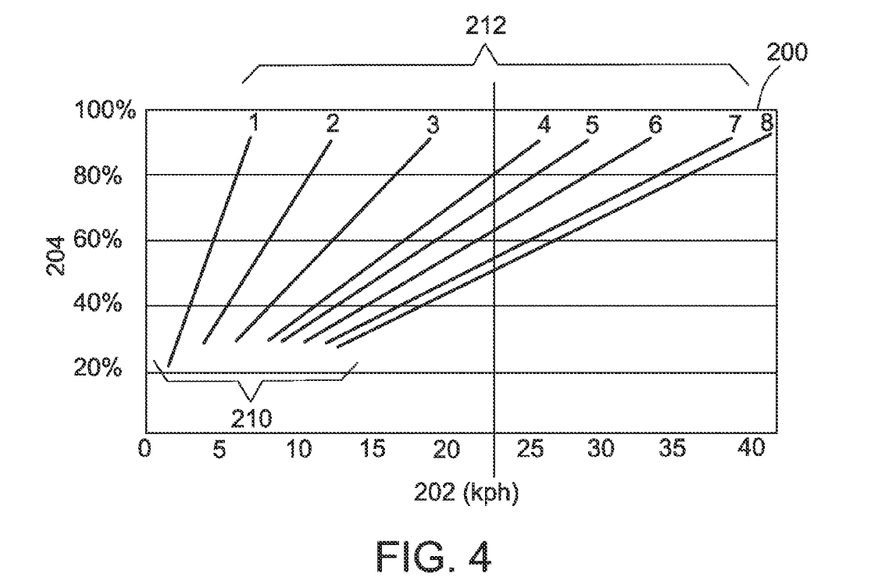
FIG. 4 is an illustration of a control map or chart correlating machine speed to a plurality of virtual gear ratios that may be associated with the CVT.

As mentioned above, the controller may regulate the output speed and/or torque of the CVT within discrete ranges by associating those ranges with a plurality of operator-selectable virtual gear ratios. Any suitable number of virtual gear ratios may be utilized including fractions or increments of discrete virtual gear ratios. The virtual gear ratios may be associated with the forward and/or reverse directions of the machine. Referring to FIG. 4, there is illustrated a virtual gear map 200 for operating a CVT utilizing a series of virtual gear ratios. For example, referring to FIG. 4, the controller may be programmed with a virtual gear map 200 that reflects the relation between machine performance and the plurality of virtual gear ratios that, in the illustrated example, may include gears (1) through (8). The virtual gear map 200 correlates virtual gear ratios (1)-(8) to the available output speeds 202 of the CVT and/or machine plotted along the X-axis. Each virtual gear ratio (1)-(8) is represented as an upward slopping, angled line and each virtual gear ratio has an associated range of virtual gear speeds between a minimum virtual gear speed 210 at the lower end of the line and a maximum virtual gear speed 212 at the higher end. For example, in the illustrated embodiment, virtual gear ratio (1) may have a minimum virtual gear speed 210 that corresponds to an intended machine speed of about 2 kilometers per hour (kph) and may have a maximum virtual gear speed 212 that corresponds to an intended machine speed of about 5 kph. Virtual gear ratio (2) may correspond to an intended machine speed of between about 4 and 12 kph. Virtual gear ratio (8) may have a maximum virtual gear speed corresponding to an intended maximum speed of the machine, e.g., 40 kph.

Thus, the plurality of virtual gear ratios (1)-(8) provides a series of increasing higher and overlapping available speed ranges. The operator may smoothly shift between adjacent virtual gear ratios due to the overlapping speed ranges. Moreover, in various embodiments, the speed ranges for each virtual gear ratio (1)-(8) may generally correspond to known travel speeds of conventional gear-based transmissions. To alter the machine speed within the range available for each virtual gear ratio, the virtual gear map 200 may chart the operator input signal, e.g., modulation of the throttle or first pedal as a percentage 204, along the Y-axis. As the first pedal functioning as the throttle is depressed in increasing degrees of modulation, the output speed of the CVT may increase by following the upward sloping lines associated with each virtual gear ratio (1)-(8). Accordingly, the operator may shift upward through the plurality of virtual gear ratios to direct the CVT and thus the machine to produce increasing output speeds 202 and a wider range of output speeds.

Figure 5:
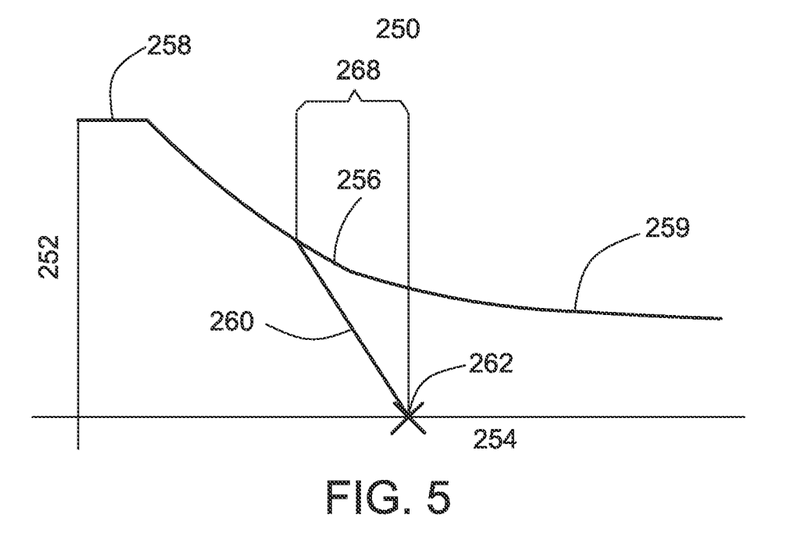
FIG. 5 is a graphical illustration of a torque-to-speed curve representing the output of the CVT with torque values plotted along the Y-axis and speed values plotted along the X-axis.

Referring to FIG. 5, there is illustrated a chart or map 250 depicting the power output characteristics of the CVT and the powertrain including the relationship between torque 252 and speed 254. Torque 252 may be measured along the Y-axis in any suitable units, such as Newton-meters or foot-pounds, and speed 254 may be measured along the X-axis in revolutions-per-minute (RPMs). The map 250 may be embodied as one or more control maps that are stored in the memory of the controller and which may assist in operation of the engine. In embodiments that utilized a virtual gear methodology, a different map or chart may exist for each of the plurality of virtual gear ratios.

The torque 252 and speed 254 of the CVT are inversely related as exemplified by the first torque-to-speed curve 256, which may be determined empirically by measuring the torque and/or speed delivered at the output of the CVT. In some instances, the first torque-to-speed curve 256 may be referred to as rimpull curve. It represents the actual output of the CVT and does not account for other transmission losses that may occur down line in the powertrain, such as frictional losses in a differential or axle bearings or rolling resistance between the ground and the propulsion devices. At low speeds, the CVT may be capable of producing high values of torque 252 as indicated by the flat portion 258 of the first torque-to-speed curve 256. However, as the output speed 254 increases along the X-axis, the torque 252 inversely drops as indicated by the downward portion 259 of the curve. This may be because the CVT is converting more of the torque from the power source, i.e., the input power, into speed to increase the RPMs output from the CVT. Accordingly, the flat portion 258 represents low speed, high torque output and the downward portion 259 represents higher speeds, lower torque output. The first torque-to-speed curve 256 may represent the operational limits of the CVT and the machine. The CVT may be set to produce torque and speed at any point under the first torque-to-speed curve 256, including at any point along the curve. To change the CVT operational settings under the first torque-to-speed curve 256, the operator may adjust the various controls and inputs 114 in the operator station 112 shown in FIG. 2.

The first torque-to-speed curve 256 of FIG. 5 may also represent a possible runaway condition in that the speed 254 continues to increase as the decrease in torque 252 begins to level off. If the machine is not engaging a sufficiently high load, or if the propulsion devices begin spinning out, the speed 254 may continue increasing. This may in part be because the CVT is capable of a near infinite range of torque-to-speed ratios. To prevent this condition from occurring, a first under-run curve 260 may be included in the map 250. The first under-run curve 260 is represented as a downward slanted line intersecting the first torque-to-speed curve 256 and the X-axis representing speed 254.

As an example of the function of the first under-run curve 260, the operator may select a desired or first target speed 262 through the inputs and controls including, for instance, the first pedal functioning as a throttle pedal. The first target speed 262 may be plotted along the X-axis among the available speeds 254. The first under-run curve 260 may be applied to the map 250 to intersect the first target speed 262 and the first torque-to-speed curve 256. Because of the slope, the first under-run curve 260 may intersect the first torque-to-speed curve 256 at a lower corresponding speed 254 than the first target speed 262. The degree or amount of offset, indicated by the offset bracket 268 and which is a function of the slope of the first under-run curve 262, may be based on any suitable factor such as, for example, speed. The offset bracket 268 may be quantified as a given percentage less than the target speed 262, although other suitable quantifiers may be used. As the output performance of the CVT approaches the first target speed 262, for instance, by moving along the first torque-to-speed curve 256, it may intersect the first under-run curve 260 prior to achieving the first target speed 262. Thereafter, the performance of the machine may be regulated in accordance with the first under-run curve 260, slopping downwards until it achieves the first target speed 262. At the first target speed 262, output of the CVT generally may be producing little or no net torque. If the machine encounters a load, the output speed 254 of the CVT may fall off the first target speed 262 by moving along the first under-run curve 260, allowing the CVT to produce more torque to overcome the resistance presented by the load. The map 250 including the first under-run curve 262 may regulate machine performance in a manner that avoids speed runaway.

Different under-run curves 260 may exist and be incorporated into the map 250 for different target speeds 262. The slope of the under-run curves 260 and thus the offset bracket 268 may change depending upon where the target speed 262 is established along the X-axis. For example, if the first target speed 262 is established nearly under the flat portion 258 of the first torque-to-speed curve 256, the first under-run curve 260 may need to dissipate a significant amount of torque 252. Accordingly, the slope of the first under-run curve 260 may be smaller (i.e. more steep) at lower speed values than at higher speed values of the first target speed 262. The size or value of the offset bracket 268 may relatedly change.

To adjust regulation and the operational characteristics of the machine, the map 250 including the curves therein as they are embodied in the controller may be rearranged and adjusted based on different operator input signals. For example, referring to FIG. 6, if the operator actuates certain inputs and/or controls, the first torque-to-speed curve 256 may be adjusted to change its characteristics. In the illustrated embodiment, the adjustment may shift the first torque-to-speed curve downwards with respect to the Y-axis to reduce the torque 252 available. This may be indicated by the second torque-to-speed curve 270 represented by dashed lines. The amount that the second torque-to-speed curve 270 is shifted from the first torque-to-speed curve 256 may be indicated by a first shift value 276, illustrated by the bracket. In addition to the second torque-to-speed curve 270 being shifted downwards, the first under-run curve 260 may also be adjusted and, more particularly, shifted backwards with respect to the X-axis to a second under-run curve 272. Moving the second under-run curve 272 may result in the first target speed 262 being shifted to a lower second target speed 274. The degree the second under-run curve 272 and the second target speed are shifted from the first under-run curve 260 and first target speed 262 may be indicated by a second shift value 278. The slope or angle of the second under-run curve 272 may be the same or different than the slope or angle of the first under-run curve 260. The second torque-to-speed curve 270 and the second under-run curve 272 may thereafter regulate the performance of the machine until the operator resets the inputs and/or controls. Shifting the second torque-to-speed curve 270 and the second under-run curve 272 in this manner lowers the amount of torque and speed that the CVT is capable of producing thereby limiting the current output potential of the machine.

Figure 7:
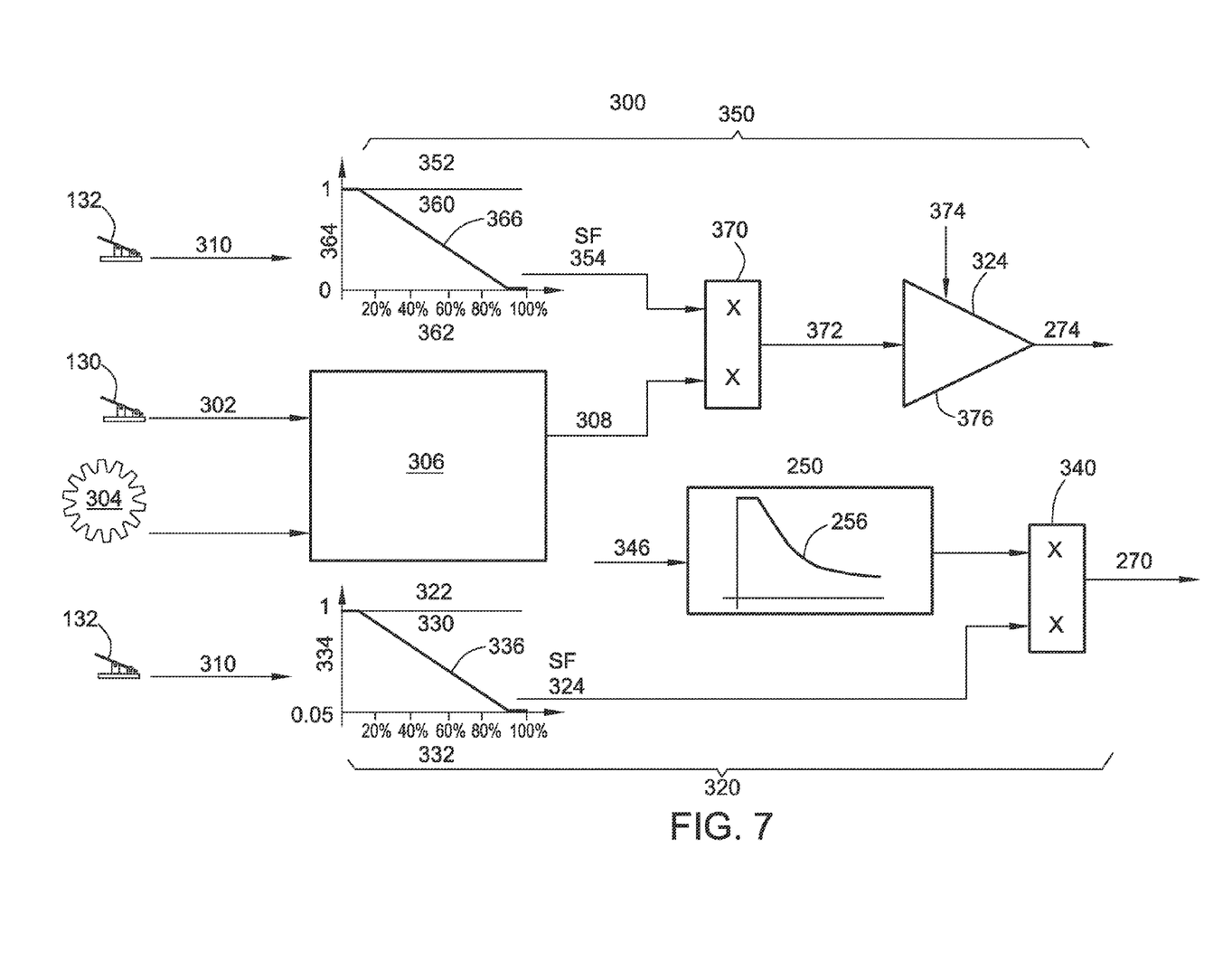
FIG. 7 is a schematic representation of a control strategy for modifying the torque-to-speed curve upon receiving an operator input signal from an operator actuated input device.

To determine the degree or amount that the torque-to-speed curve and the under-run curve are to be shifted, i.e., the first and second shift values 276, 278, the controller may execute a series of instructions to perform a control strategy 300, for example, such as the one indicated in FIG. 7. The control strategy 300 may be composed of any suitable types of software routines, functions, modules, objects, classes, data structures, methods, records, libraries, etc., or any of the same implemented in hardware, collectively referred to herein as routines. Referring to FIGS. 3 and 7, the control strategy 300 may receive one or more inputs from operator actuation of the input devices. For example, the operator may modulate the first pedal 130 functioning as a throttle. The first pedal sensor 192 may register the degree or amount of modulation, translate it to a first signal or throttle input 302 and communicate the signal to the control strategy 300. The operator may also use the virtual gear shifter 138 to select a virtual gear ratio from the plurality of virtual gear ratios associated with the CVT 110. The selected virtual gear ratio may be indicated by a second signal or virtual gear input 304 that is also communicated to the control strategy 300. The control strategy 300 may include a speed determination routine 306 that analyzes the throttle input 302 and the virtual gear input 304 to determine the machine speed being requested by the operator. The speed determination routine 306 may result in requested speed signal 308 in, for example, RPMs that is communicated onto other portions of the control strategy 300 for further processing.

To temporally reduce or limit the machine torque and/or speed, an operator may modulate the second pedal 132 functioning as a clutch pedal to simulate partial disengagement of the CVT 110 from the propulsion devices 104. By doing so, the operator may be signaling a desire to actuate or simulate slippage of a physical clutch so that the powertrain 108 reduces or dissipates at least a portion of the rotary power being transmitted to the propulsion devices 104. The amount that the torque 252 and speed 254 are reduced or limited may be realized as the amount by which the torque-to-speed and the under-run curves are shifted in FIG. 5. Accordingly, the requested clutch slippage may be simulated by regulating the CVT performance and limitations through the shifted curves rather than by actually slipping a physical clutch. To register modulation of the second pedal 132, the second pedal sensor 194 may measure the degree that the second pedal is articulated and translate that into a third signal or clutch input 310 that is communicated to the control strategy 300.

A torque limiting process 320, represented by the lower portion of the control strategy 300 in FIG. 7, may further process the clutch input 310 to determine the degree that the torque-to-speed curve is shifted downwards. For example, to convert the clutch input 310 into a value that may be more readily interpreted by the control strategy 300, the torque limiting process 320 may direct the clutch input 310 to a first scaling routine 322. The first scaling routine 322 may convert the clutch input 310 into a first scale factor (SF) 324 ranging between 0.05 and 1.0. Values between 0.05 and 1.0 may correspond to intermediate degrees of modulation of the second pedal 132. For example, if the operator depresses the second pedal about 50%, the first scaling routine 322 will convert the resulting clutch input 310 to a first SF 324 of about 0.53.

To accomplish scaling the clutch input 310, the first scaling routine 322 may include a first scaling table or first scaling chart 330 that registers the magnitude of the clutch input 310 (e.g., pedal modulation as a percentage) along the X-axis 332 and the range of possible scale factors from 0.05 to 1.0 along the Y-axis 334. A first reference curve or first reference line 336 may be plotted in the scaling chart 330 to enable conversion by cross-referencing the clutch input 310 with the first reference line 336. In this embodiment, the range of possible scale factors along the Y-axis 332 terminates at 0.05 so that a minimal torque output is always available to, for example, assist in reengaging the CVT from a complete neutralization state. In alternative embodiments where this is problem is less of a concern, the range of possible scale factors may terminate at 0.0. One possible advantage of using the first scaling routine 322 to convert the clutch input 310 to a first SF 324 is that the clutch input is normalized to a readily interpretable value for use with other functions or routines.

The torque limiting process 320 may direct the first SF 324 to a first multiplication routine 340 for limiting or adjusting the torque-to-speed curve. The first multiplication routine 340 may also receive information in the form of a chart or map, similar to the map 250 depicted in FIG. 5, that includes information about the unadjusted first torque-to-speed curve 256 associated with the CVT. Further information received by the first multiplication routine 340 may include the actual machine speed 346 as may be determined from the machine speed sensor 159 in FIG. 3, and any other suitable information. The first multiplication routine 340 may multiply or otherwise process the received information to determine a new output torque-to-speed curve, which may be generated as the second torque-to-speed curve 270, to control the CVT 110. For example, the difference between the second torque-to-speed curve 270 and the unadjusted first torque-to-speed curve 256 may be the amount or the first shift value 276 that the second torque-to-speed curve 270 is shifted from the first torque-to-speed curve 256 in FIG. 6. The first shift value 276 is thus correlated to the clutch input 310 through the first SF 324.

To determine the degree or amount that the second under-run curve 272 should be shifted, the control strategy 300 may also include a speed limiting process 350 represented toward the upper half of FIG. 7. Shifting of the under-run curve may also be based on the clutch input 310 representing articulation of the second pedal 132. The speed limiting process 350 may convert the raw clutch input 310 to a scale factor (SF) through a scaling routine that may be the same as the first scaling routine 322 or that may be a different routine. In the illustrated embodiment, the speeding limiting process 350 includes a different second scaling routine 352 to generate a second scaling factor (SF) 354. For example, the second scaling routine 352 may convert the raw clutch input 310 to a normalized value between 0.0 and 1.0 as opposed to 0.05-1.0 in the first scaling routine 322. To accomplish this, the second scaling routine 352 may include a second scaling table or second scaling chart 360 that correlates the clutch input 310 as a percentage of pedal modulation along the X-axis 362 with a range of possible scale factors between 0.0 and 1.0 on the Y-axis 364. The correlation between the X-axis and the Y-axis may be completed by a second reference line 366. In an alternative embodiment, the second SF 354 may be the same as the first SF 324.

The speed limiting process 350 may direct the second SF 354 to a second multiplication routine 370 where the second SF may be combined with the requested speed signal 308. The SF 354 and requested speed signal 308 may be multiplied or otherwise processed to generate a derived speed limit 372. The derived speed limit 372 is derived from and accounts for modulation of the first pedal 130, representing the throttle, and the second pedal 132, representing the clutch. Because the machine may operate in different directions, the derived speed limit 372 may be further processed with a direction signal 374 from the F-N-R selector 136 through a machine direction routine 376. The result may be the second target speed 274 of FIG. 6. Because of the SF 354 resulting from depressing the second pedal 132, the second target speed 274 will be less than the requested speed signal 308 that is based on the throttle input 302 from the first pedal 130 alone. The difference of the second target speed 274 and the requested speed signal 308 will be the second shift value 278. The second target speed 274 may be applied to the X-axis of the map 250 of FIG. 6 and the first under-run curve 260 may be moved to intersect the second target speed and thereby generate the second under-run curve 272.

Figure 8:
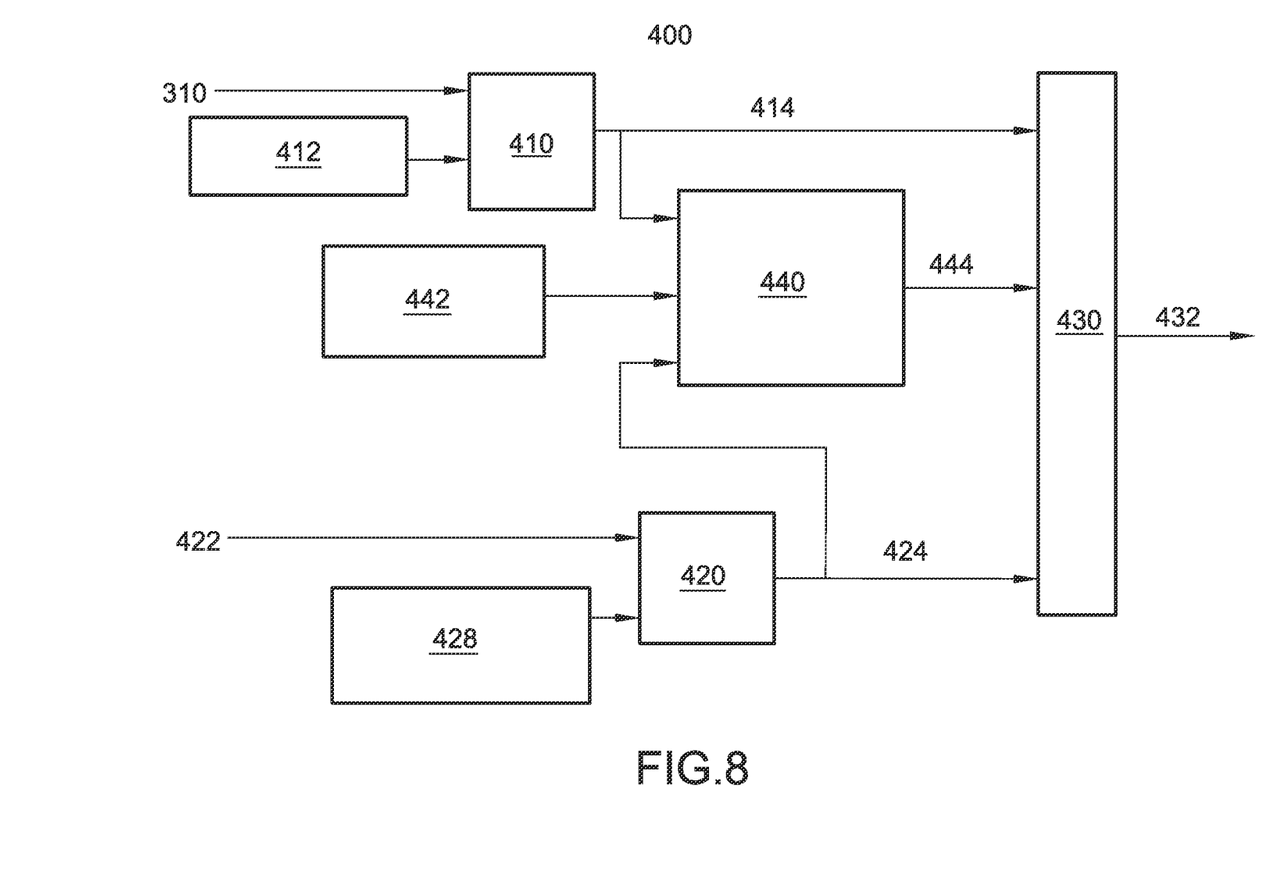
FIG. 8 is another schematic representation of a control strategy for controllably disengaging the CVT upon receiving a predetermined operator input signal from an operator actuated input device.

Referring to FIG. 3, in some instances, the operator may depress the second pedal 132 to an extent that the shifting of the torque-to-speed curves and/or under-run curves may no longer represent accurately the desired output of the CVT 110. For example, full depression of the second pedal 132 may be intended to command complete disengagement of the CVT 110 from the propulsion devices 104. To avoid possible damage or harm to the CVT 110 from sudden or abrupt disengagement, the controller 190 may execute or perform a second control strategy or neutralization strategy 400. Referring to FIGS. 3 and 8, the neutralization strategy 400 may receive the clutch input 310 from depression of the second pedal 132. To assess the command being conveyed by the clutch input 310, the neutralization strategy 400 may include a first comparison routine 410 that compares the clutch input with a predetermined neutralization threshold 412. The neutralization threshold 412 may represent the degree or amount of depression of the second pedal 132 that signifies a desire to completely disengage the CVT 110, for example, 96% of full depression. In various embodiments, the neutralization threshold may be adjustable to suit operator preference. If the clutch input 310 exceeds the neutralization threshold 412, the first comparison routine 410 may produce a first binary command 414, such as a yes/no, true/false, or positive/negative command, confirming whether the CVT 110 should be disengaged or not.

Because premature or abrupt disengagement of the CVT 110 when operating at sufficiently high torque and/or speed outputs may cause the machine to jerk in an uncontrolled or uncomfortable manner and may possibly damage the powertrain 108, the control strategy 400 may include a second comparison routine 420 to assess the torque and/or speed output of the CVT. The second comparison routine 420 may receive a signal representing the actual torque value 422 produced from the CVT, for example, by communicating with the CVT sensor 158 or another sensor located in the hydrostatic line as described above. The second comparison routine 420 may also receive a predetermined torque threshold 426 above which sudden neutralization of the CVT may not be comfortable or may damage the CVT. This torque threshold 426 may be determined empirically and, in various embodiments, the torque threshold may also be adjustable. The second comparison routine 420 compares the two inputs to determine if it is acceptable to disengage the CVT and produces a second binary command 424 indicative of the result.

The first and second binary commands 414, 424, may be passed on to a third comparison routine 430 to determine authorization to neutralize the CVT 110. The third comparison routine 430 may be a basic logical function comparing the results reflected in the first and second binary commands 414, 424. For instance, if the first and second binary commands 414, 424 are both positive, indicating that all conditions have been realized to disengage the CVT, the third comparison routine may issue an appropriate neutralization command 432. The neutralization command 432 may be directed to the CVT output member 152 that may be a physical clutch capable of engaging and disengaging. Disengagement of the CVT output member 152 decouples the CVT 110 from the propulsion devices 104 preventing further transmission of power. However, if either or both the first and second binary commands 414, 424 are negative, the conditions are not met and the neutralization command 432 may so indicate. Accordingly, unless the second binary command 424 is positive, indicating that CVT torque output is at an appropriately low value, the CVT 110 will not prematurely neutralize, thereby avoiding sudden jerking motions and possible component harm. The neutralization strategy 400 thereby delays disengagement of the CVT until conditions are appropriate to avoid sudden, and possibly damaging, surges in the machine.

As a related function, in an embodiment, the neutralization strategy 400 may be configured to prematurely avoid reengaging the CVT 110 and the propulsion devices 104 after the second pedal 132 has been released. For example, the neutralization strategy 400 may include a recovery routine 440 that may assess whether operating conditions are appropriate for the CVT 110 to reengage. To assess the conditions, the first and second binary commands 414, 424 may be directed to the recovery routine 440. From the first binary command 414, the recovery routine 440 may determine if the second pedal 132 has been released past the neutralization threshold 412 and from the second binary signal 424, the recovery routine may assess the current torque output. In some embodiments, the recovery routine 440 may include in its determination a predetermined time period 442 representing an estimated period of time lapse that should occur before the conditions are appropriate for the CVT 110 to reengage. In other embodiments, the recovery routine may include another suitable rate-limiting feature. The recovery routine 440 may compute the inputs and, if appropriate, issue a recovery command 444 to the third comparison routine 430 that may direct reengagement of the CVT 110 via the CVT output.

INDUSTRIAL APPLICABILITY

Figure 9:
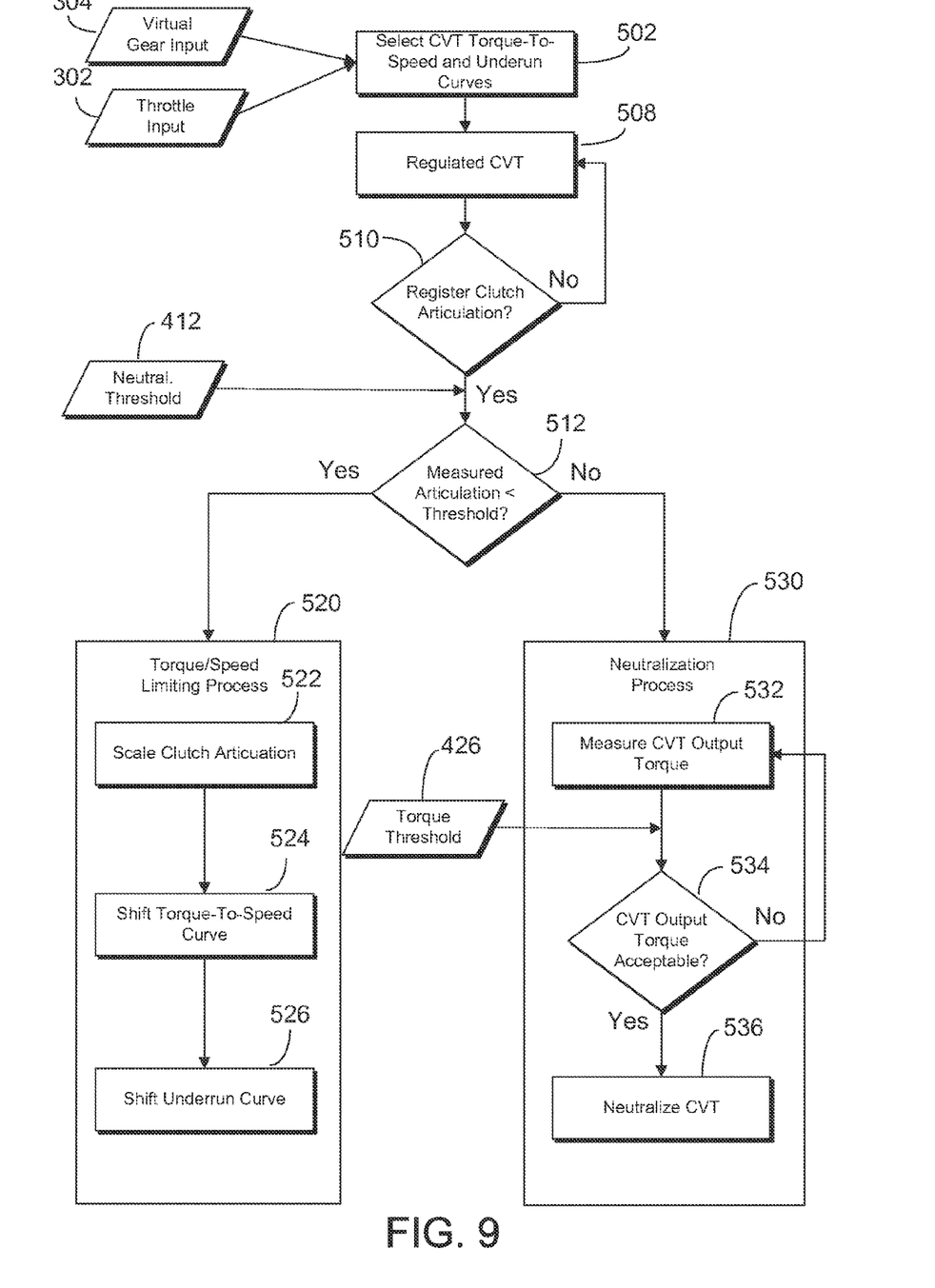
FIG. 9 is a flowchart illustrating a possible routine for regulating operation of a machine including a CVT to limit torque and/or speed in a manner simulating a clutch.

In accordance with an aspect of the disclosure, a CVT included with the powertrain of a machine may be regulated in a manner that simulates a physical clutch. In particular, an operator may manipulate the controls illustrated in FIG. 3, including the second pedal 132 designated as the clutch input device, to adjust the speed and/or torque output of the CVT in a manner that may simulate the slippage and disengagement of a clutch. Referring to FIG. 9, there is illustrated an embodiment of a flowchart 500 for regulating the powertrain 108 shown in FIG. 3 to facilitate clutch functionality. The steps and actions described by the flowchart 500 may be set forth in computer-readable instructions accessible by and executable in the controller 190. The flowchart 500 may include a first selection step 502 to select one or more charts or maps, such as the map 250 illustrated in FIG. 5, to regulate operation of the powertrain 108 including the CVT 110. The maps and charts may be computer readable and computer executable programs or software that the controller 190 may process.

The map 250 may include the unaltered first torque-to-speed curve 256 and the first under-run curve 260 to limit the amount of torque and/or speed that the CVT may be able or capable of producing. In the embodiments utilizing the virtual gear methodology, the different virtual gear ratios may correspond to different maps with torque-to-speed curves reflecting different characteristics and functionality. Accordingly, the first selection step 502 may receive signals from the virtual gear shifter 138 including the virtual gear input 304 regarding the operator's selected virtual gear ratio for use in the flowchart 500. To assist setting the target speed of the machine, the flowchart 500 may also receive the throttle input 302 indicative of the operator modulation of the first pedal 130 functioning as a throttle input device. The selected virtual gear ratio set forth in the virtual gear input 304 and the throttle input 302 may determine a target speed 262. The target speed 262 may be plotted in the map 250 of FIG. 5 and the appropriate first under-run curve 260 is applied to intersect the target speed and first torque-to-speed curve 256. Absent further contrary input from the operator, the flowchart 500 in a first regulation step 508 may regulate the output of the CVT including speed and/or torque in accordance with the unaltered first torque-to-speed curve 256 and first under-run curve 260.

In an attempt to adjust the speed and/or torque output of the machine, though, the operator may modulate the second pedal 132. The flowchart 500 may include a clutch registration step 510 that may receive input from the second pedal sensor 194 to monitor articulation of the second pedal 132. If the second pedal 132 is not depressed, the flowchart 500 may enter a loop in which it continues to regulate operation in accordance with the first torque-to-speed curve 256 and the first under-run curve 260 by returning to the first regulation step 508 while periodically or continuously monitoring the second pedal 132 via the clutch registration step 510. If, however, the clutch registration step 510 does register articulation of the second pedal 132, the flowchart 500 may include a clutch measurement step 512 to evaluate the degree of clutch articulation. The various degrees of articulation of the second pedal 132 may indicate that the operator is attempting to command different responses of the machine.

For example, if the second pedal 132 is depressed to an intermediate degree, e.g., 5%-95% percent, the operator may be attempting to temporarily slow the machine down in accordance with slipping of a clutch. Specifically, the operator may repeatedly depress and release the second pedal through intermediate degrees to slip the clutch and modulate the torque and/or speed output in a manner that moves the machine in relatively fine amounts or degrees, for example, when approaching a load to engage. This activity is sometimes referred to as "inching" the machine. If the clutch measurement step 512 determines articulation of the second pedal 132 is within an appropriate range to indicate "inching," the flowchart 500 may proceed to a torque/speed limiting process 520 to simulate slippage of a clutch.

Figure 6:
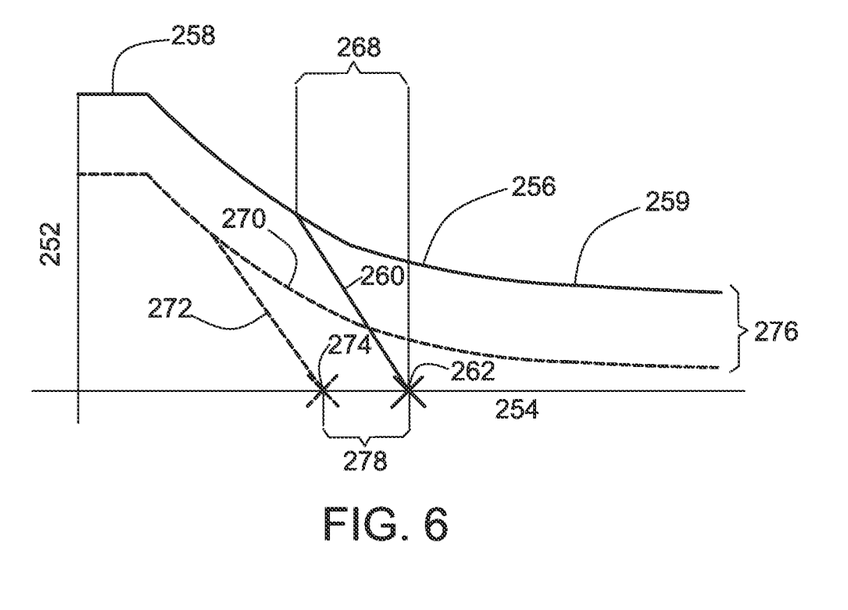
FIG. 6 is a graphical illustration of the torque-to-speed curve of FIG. 4 as modified to reduce the torque and speed output of the CVT.

Specifically, to determine the degree of slippage, the torque/speed limiting process 520 of FIG. 9 may include a scaling step 522 that scales the amount the second pedal is articulated. This may produce a scaling factor similar to SF 324, 354 described with respect to the control strategy 300 of FIG. 7. Accordingly, the operator may vary the perceived clutch slippage by modulating the second pedal 132 to different intermediate degrees. The torque/speed limiting process 520 of FIG. 9 may further include a first shift step 524 to shift the torque-to-speed curve in accordance with the scaling step 522. In an embodiment, the first shift step 524 may correspond to the torque limiting process 320 in FIG. 7. Likewise, the torque/speed limiting process 520 may include a second shift step 526 to shift the under-run curve. In an embodiment, the second shift step 526 may correspond to the speed limiting process 350 in FIG. 7. Referring to FIG. 6, the first and second shift steps 524, 526 may cause the first torque-to-speed curve 256 and the first under-run curve 260 to shift to the second torque-to-speed curve 270 and the second under-run curve 272 by the first and second shift values 276, 278. The first and second shift steps 524, 526 may occur simultaneously. The torque and/or speed output of the CVT are thereby limited and restrained by the shifted second torque-to-speed curve 270 and the second under-run curve 272 in a manner that simulates clutch slippage, i.e., incomplete or partial transmission of power through the powertrain.

Accordingly, the torque/speed limiting process 520 may correlate the limitations applied to the CVT output in accordance with the position of the second pedal. One advantage of shifting both torque and speed limits may be realized in the responsiveness of the torque and/or speed output of the CVT. For example, referring to FIG. 6, the output torque 252 being commanded at the time the second pedal is engaged may be underneath and displaced from the first torque-to-speed curve 256 such that lowering the torque limit to the second torque-to-speed curve 270 may not substantially affect the perceived machine performance. However, reducing the first target speed 262 to the second target speed 274, in addition to and, in an embodiment, at the same approximate time as shifting the first and second torque-to-speed curves 256, 270, may produce a noticeable immediate affect that operators may sense thereby assisting the "inching" activity. Furthermore, immediate or early shifting of the under-run curve may reduce the "dead zone" sensation during initial articulation of the second pedal.

If the clutch measurement step 512 of the flowchart 500 in FIG. 9, measures a greater degree of modulation of the second pedal 132, it may indicate that the operator is attempting to command a different response from the machine. For example, the clutch measurement step 512 may measure or compare the degree of modulation against a predetermined neutralization threshold 412 similar to that described with respect to the control strategy 400 of FIG. 8. If the second pedal 132 is depressed in excess of the neutralization threshold 412, e.g., 96%, the operator may be indicating a desire to completely disengage the CVT 110 similar to the reaction of a fully released clutch. To accomplish this, the flowchart 500 may proceed to a neutralization process 530 to disengage the CVT 110 from the propulsion devices 104. To facilitate this transition and avoid possible damage to the powertrain 108, the neutralization process 530 may include several steps to assess whether conditions are proper for disengagement. In particular, the neutralization process 530 may include a torque measurement step 532 that measures the current torque output from the CVT 110. That value is passed to a torque comparison step 534 that compares the actual torque measured in the torque measurement step 532 with a predetermined torque threshold 426, such as described with respect to the control strategy 400 of FIG. 8, to determine if conditions are appropriate for neutralizing the CVT.

If the conditions are not appropriate, the neutralization process 530 may maintain engagement of the CVT and may return to the torque measurement step 532 to continue measuring the output torque of the CVT 110. During this time, the output torque may be decreasing in accordance with the torque/speed limiting process 520 that may be proceeding simultaneously due to depression of the second pedal 132. If, however, the torque comparison step 534 determines that the CVT output torque is below the torque threshold 426, the neutralization process 530 issues a neutralization command 536 to disengage the CVT 110 from the propulsion devices 104. This may be accomplished by release of the CVT output member 152 that may function as a clutch. In an embodiment, the neutralization process 530 may be embodied as the neutralization strategy 400 of FIG. 8.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A method of controlling speed in a machine having a continuously variable transmission (CVT) operatively coupled to a power source; the method comprising:
   regulating a CVT output of the CVT in accordance with a rimpull torque-to-speed curve including a generally inverse relation between a CVT output torque and a CVT output speed, the rimpull torque-to-speed curve limiting the CVT output torque;
   receiving a first operator input signal indicating a desired change in a machine output;
   converting the first operator input signal to a first scale factor;
   shifting the rimpull torque-to-speed curve based in part on the first scale factor to reduce the CVT output torque available; and
   applying an under-run curve to the rimpull torque-to-speed curve, the under-run curve corresponding to a first target speed of the machine and limiting the CVT output speed.

2. The method of claim 1, further comprising:
   converting the operator input signal to a second scale factor; and
   adjusting the under-run curve based in part on the second scale factor to reduce the CVT output speed.

3. The method of claim 2, wherein the step of adjusting the under-run curve results in shifting the first target speed to a second target speed that is less than the first target speed.

4. The method of claim 3, wherein the CVT is operatively coupled to a propulsion device.

5. The method of claim 4, further comprising:
   comparing the first operator input signal to a neutralization threshold; and
   initiating a neutralizing routine to disengage the CVT from the propulsion device if the first operator input signal exceeds the neutralization threshold to disengage the CVT from the propulsion device.

6. The method of claim 5, further comprising:
   measuring the CVT output torque;
   comparing the CVT output torque to a torque threshold; and
   disengaging the CVT from the propulsion device.

7. The method of claim 1, further comprising selecting a virtual gear ratio from a plurality of virtual gear ratios associated with the CVT, each virtual gear ratio of the plurality of virtual gear ratios including a range of speeds between a minimum virtual gear speed and a maximum virtual gear speed.

8. The method of claim 2, further comprising registering a second operator input signal indicating a desired throttle setting.

9. The method of claim 8, further comprising determining the first target speed based upon the virtual gear ratio selected and the second operator input signal.

10. A machine comprising:
a continuously variable transmission (CVT) operatively coupled to a power source, the CVT producing a CVT output torque and a CVT output speed;
a first operator input device producing an operator input signal indicating a change in operation of the machine; and
a controller communicating with the first operator input device and controlling output of the CVT in accordance with a control map, the control map including a torque-to-speed curve relating the CVT output torque to the CVT output speed and an under-run curve corresponding to a target speed; wherein the first operator input device simultaneously adjusts the torque-to-speed curve and the under-run curve.

11. The machine of claim 10, where adjusting the torque-to-speed curve reduces the CVT output torque available.

12. The machine of claim 11, wherein adjusting the under-run curve reduces the target speed.

13. The machine of claim 12, wherein the first operator input device is configured for actuation within a range of articulation including intermediate articulation and full articulation, wherein the torque-to-speed curve and the under-run curve are adjusted during intermediate articulation.

14. The machine of claim 13, further comprising a propulsion device, and wherein the controller includes a neutralization routine for disengaging the CVT and the propulsion device, the neutralization routine is initiated by articulation exceeding a neutralization threshold.

15. The machine of claim 14, further comprising a CVT output sensor for measuring the CVT output torque, the CVT output sensor communicating with the controller.

16. The machine of claim 15, wherein the neutralization routine compares the CVT output torque with a neutralization threshold and disengages the CVT and the propulsion device if the CVT output torque is below the neutralization threshold.

17. A method of regulating CVT output of a continuously variable transmission (CVT), the CVT output including a CVT output torque and a CVT output speed, the method comprising:
receiving a first operator input signal indicating a target speed;
determining the CVT output torque in accordance with a torque-to-speed curve if the CVT output speed is a predetermined quantity less than the target speed;
determining the CVT output torque in accordance with an under-run curve if the CVT output speed is within the predetermined quantity of the target speed;
receiving a second operator input signal to adjust operation of the CVT; and
adjusting the torque-to-speed curve and the under-run curve upon receiving the second operator input signal to reduce the CVT output torque available and the target speed.

18. The method of claim 17, wherein the first operator input signal is one of a throttle input and a virtual gear input, and the second operator input signal is a clutch input.

19. The method of claim 18, further comprising comparing the clutch input to a neutralization threshold and initiating a neutralizing routine to disengage the CVT if the clutch input exceeds the neutralization threshold.

20. The method of claim 19, further comprising measuring the CVT output torque and maintain engagement of the CVT if the CVT output torque exceeds a torque threshold.

\* \* \* \* \*